Figure 1:
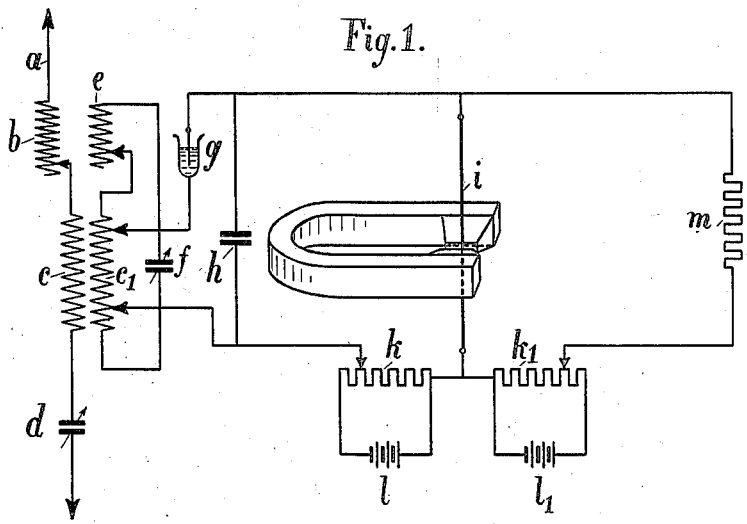

W. SCHLOEMILCH.
RECEIVER FOR WIRELESS TELEGRAPHY.
APPLICATION FILED AUG. 31, 1906.

958,181.

Patented May 17, 1910.

UNITED STATES PATENT OFFICE.

WILHELM SCHLOEMILCH, OF BERLIN, GERMANY, ASSIGNOR TO GESELLSCHAFT FÜR DRAHTLOSE TELEGRAPHIE M. B. H., OF BERLIN, GERMANY.

RECEIVER FOR WIRELESS TELEGRAPHY.

958,181.   Specification of Letters Patent.   Patented May 17, 1910.

Application filed August 31, 1906. Serial No. 332,839.

*To all whom it may concern:*

Be it known that I, WILHELM SCHLOEMILCH, a subject of the King of Prussia, residing at Berlin, Germany, have invented certain new and useful Improvements in Receivers for Wireless Telegraphy, of which the following is a full, clear, and exact description, reference being had to the accompanying drawing, forming a part of this specification.

This invention relates to receivers for wireless telegraphy which act in conjunction with detectors which correspond to current intensities, and which therefore, differing from the ordinary coherers, represent a good contact which even in a condition of repose has a good ohmic resistance. To these belong, among others, the electrolytic cell, the microphonic contact, the bolometer, the gas section *in vacuo* (rectifier, thermo detector and the like).

This invention relates to a receiver in which the known detector is combined with a thread galvanometer acting as an indicator in such a way that a response of the detector has for its consequence a deflection of the thread of the galvanometer.

It has already been proposed from various sides to utilize a galvanometer as indicator in wireless telegraphy, but the galvanometers hitherto proposed and employed for this object have all been found impracticable. Now experiments have shown that a thread galvanometer has all the properties for increasing the effectiveness of the receiver when acting in conjunction with a detector responding to current intensities. The thread galvanometer, as is well-known, is based on the principle of a flexible conductor or thread being arranged in a highly magnetic field, which thread, at the moment of the passage of a current through it, is deflected at right angles to the lines of force of the magnetic field. The advantages which make such a thread galvanometer peculiarly adapted for wireless telegraphy, consist substantially in that firstly it is less influenced by mechanical shocks and that secondly it has no friction, and consequently is very sensitive, and further that it has only a very small self-induction and consequently a very slight inertia, and finally that in case of the breakage of the thread it may be easily replaced together with its suspension device.

It has been found preferable to combine the thread galvanometer with the detector by means of a circuit in such a way that the thread of the galvanometer is only traversed by a current when the detector responds to the influence of the electrical waves received. The connections of the detector do not differ from those hitherto customary.

The galvanometer is preferably combined with means which allow of the deflection or movement of the thread being well observed, for instance, the shadow of the thread produced by means of a source of light may be thrown on a screen on which then by means of a scale the extent of the deflection may be well watched and read off. In similar manner the deflection of the thread may be recorded on a strip of photographic paper which is moved forward, and may be read off after the manner of the Morse script.

The deflection of the thread, in addition to being made visible optically, may also be ascertained acoustically, by, for instance, causing the deflection of the thread to be utilized for allowing a jet of light to fall on a selenium cell by means of which an electric circuit is then influenced in known manner and a signal given. A curcuit may also be closed by mechanical means by the thread, the tension produced by its deflection, for instance, being used for moving a contact element.

Figure 2:
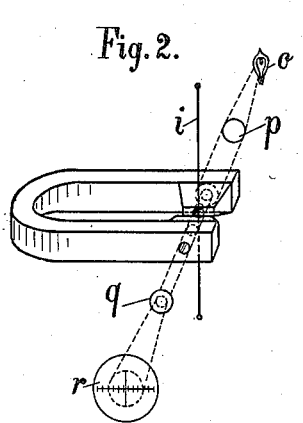
Figure 3:
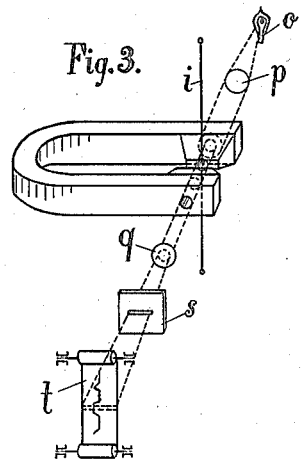
Figure 4:
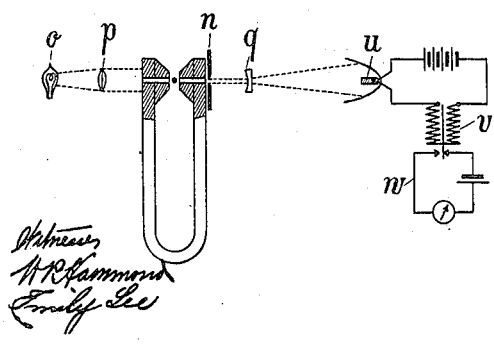
Figure 5:
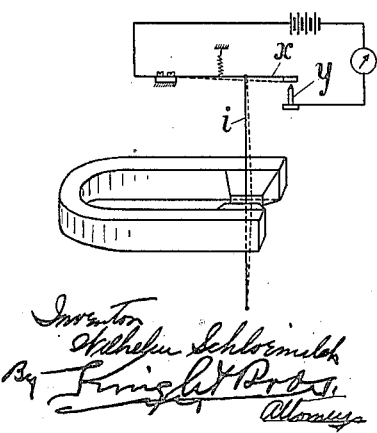

Various forms of construction of the present invention are shown diagrammatically in the accompanying drawings in which:

Figure 1 shows a general arrangement of the invention in a detector circuit of a wireless station. Fig. 2 shows diagrammatically an arrangement by which the deflection of the thread may be read off a scale on a screen. Fig. 3 shows diagrammatically an arrangement in which the movement of the thread is fixed on a strip of photographic paper. Fig. 4 shows diagrammatically an arrangement in which the thread movement is observed with the aid of a selenium cell, and Fig. 5 shows diagrammatically an arrangement in which the movement of the thread is observed by causing the latter to mechanically control the opening and closing of an auxiliary circuit.

In the receiver connections shown in Fig. 1, *a* indicates the aerial conductor which is earthed or connected with a capacity over a variable self-induction $b$, the primary coil $c$ of the coupling transformer, and a variable condenser $d$. The secondary coil $c'$ belongs to a resonator circuit which also contains a variable self-induction $e$ and a variable condenser $f$. The detector circuit is branched off from the secondary coil $c'$ which circuit contains a detector $g$ which responds to current intensities, and a condenser $h$. The detector also belongs to a local circuit which contains a resistance $m$, a potentiometer $k$ $k'$ and a secondary coil $c'$. The sources of current $l$ $l'$ are connected in such a manner to the potentiometer that a flow of current over the detector $g$ takes place, the strength of which may be exactly regulated by means of the potentiometer. The galvanometer $i$ the thread of which is connected at such points of the circuit that usually no current flows through the thread, is placed across this circuit. This condition may of course be easily brought about by regulating the potentiometer. As soon as the detector $g$ is influenced by electric waves, an alteration of the electric condition of the local circuit takes place, and a flow of current is produced over the thread $i$ which then has for consequence the deflection of the latter.

What in the foregoing is attained by means of two separate sources of electromotive force, might also be attained in known manner by means of only one such source, for instance, by the combination of both batteries $l$ $l'$ into only one.

In order to allow of the diversion or deflection of the thread being easily observed various means may be employed. Fig. 2 shows an arrangement by means of which the deflection of the thread may be read off on a screen with a scale. For this object the two magnet poles, between which the thread is arranged, are perforated transversely and a group of light rays proceeding from a lamp $o$ and directed parallel by the lens $p$ are passed through the perforations in the magnet and then thrown on a screen $r$ by means of a lens $q$. The thread $i$ encountered by the group of rays then forms a shadow on the screen $r$, so that its movements on the screen may be easily observed and determined.

Fig. 3 shows diagrammatically an arrangement which allows of the movement of the thread being fixed on a strip of photographic paper. For this object the group of light rays, after having emerged from the perforations of the magnet and passed the lens $q$, is conveyed through a shutter $s$ with a horizontal slot and then thrown on a strip of photographic paper $t$ moved at right angles to the thread movement. The group of rays marks itself on this strip as a narrow light line corresponding to the opening of the shutter and covering the entire width of the strip, which line in its center part has a dark point formed by a shadow of the thread. On the paper strip being moved forward, a line produced by the movement of the thread or rather of the shadow point, is printed on a ground made by exposure. The reason the arrangement for photographically fixing the thread movement is only shown diagrammatically in the drawings and not given in detail, is because the apparatus necessary for this is well known in the art.

Fig. 4 shows the thread galvanometer in combination with other means for ascertaining the deflection of the thread. In this case also a group of light rays is employed for the object stated, which rays after passing the perforations in the magnet and a shutter $n$ are thrown through a lens $q$ on a hollow mirror in the focus of which a selenium cell $u$ is arranged. The cell lies in a circuit containing a battery and relay $v$. The electric arrangement is so adapted that by an illumination of the cell the relay is caused to move and to close a signal circuit $w$ or to operate a Morse apparatus. The point of the aperture in the shutter $n$ is so selected that the thread in its position of repose entirely covers the aperture of the shutter, so that no light can pass through it. If, however, the thread be deflected the light passes through the shutter on to the mirror and thus influences the selenium cell.

Fig. 5 shows as an example an apparatus which utilizes the movement of the thread directly for closing a circuit. As shown in the drawings, one end of the thread $i$, which is movable between the magnet poles, is connected with a contact spring $x$, the elasticity of which usually holds the thread tight and keeps the contact $y$ open. If the thread be deflected the consequence of this is the compressing of the contact spring and the closing of the contact. The current may then be used for operating an indicating mechanism or an alarm.

It is evident that in addition to the means hereinbefore indicated many other means and ways exist of rendering the movement of the thread audible or visible, as appears desirable for the present object in receiving wireless telegrams.

Instead of arranging the thread in the circuit in such a way that in a position of repose no current flows through it, the galvanometer may of course also be combined with a circuit in such a way that the thread is constantly traversed by a current the intensity of which is altered under the influence of the detector. The first method has, however, the advantage that in a position of repose no current is used, and the sensitiveness of the galvanometer when the detector responds is very great. The thread galvanometer also affords the possibility of measuring the intensity of the electric waves received. This may, as is evident without further explanation, take place either by observing its movement, or by other suitable means known in the art.

Having explained my invention, what I do claim and desire to secure by Letters Patent is:

A receiver for wireless telegraphy, comprising an oscillating circuit containing a self induction coil, a detector circuit branched off from the self-induction coil, a detector responding to current intensities and a condenser included in said detector circuit, a thread galvanometer parallel to the said condenser and means for rendering the movement of the thread perceptible, substantially as described.

In witness whereof, I hereunto subscribe my name, this 7th day of August A. D. 1906.

WILHELM SCHLOEMILCH.

Witnesses:
HENRY HASPER,
WOLDEMAR HAUPT.